Sept. 20, 1932.  G. H. STONER  1,878,911
BRAKE
Filed July 26, 1930  2 Sheets-Sheet 1

INVENTOR:
George H. Stoner
by Macleod, Calver, Copeland & Dike
Attys.

Sept. 20, 1932.　　　G. H. STONER　　　1,878,911
BRAKE
Filed July 26, 1930　　2 Sheets-Sheet 2
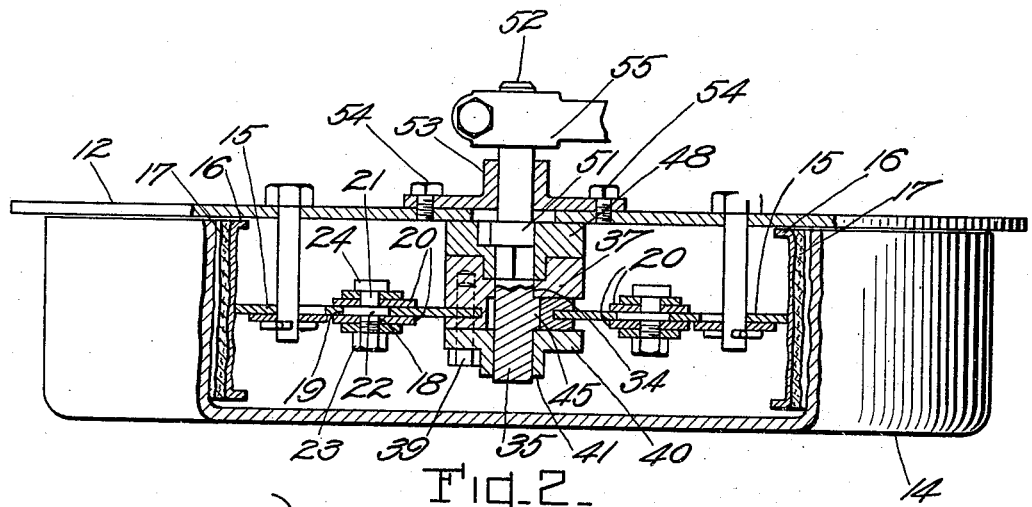
Fig. 2.
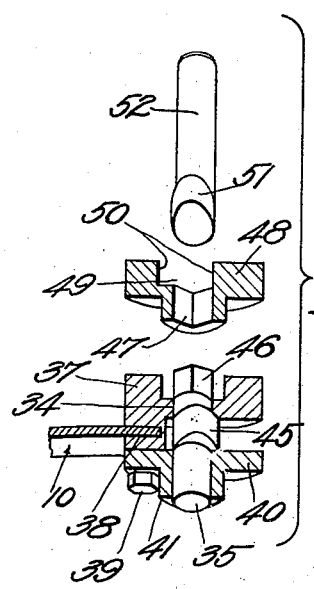
Fig. 3.
Fig. 4.
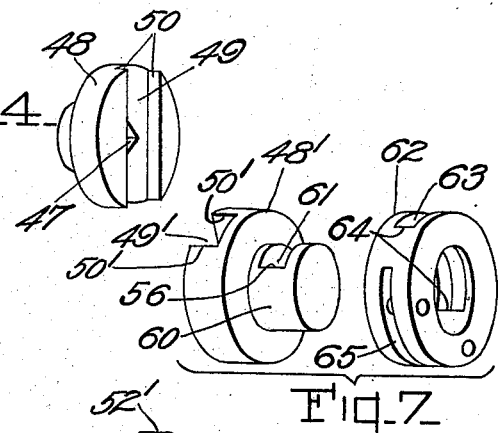
Fig. 7.
Fig. 5.
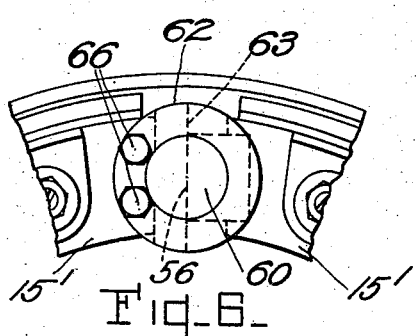
Fig. 6.
INVENTOR:
George H. Stoner
by Macleod, Calver, Copeland + Dike
Attys.

Patented Sept. 20, 1932

1,878,911

UNITED STATES PATENT OFFICE

GEORGE H. STONER, OF BOSTON, MASSACHUSETTS, ASSIGNOR TO STONER-AMES BRAKE COMPANY, INC., OF BOSTON, MASSACHUSETTS, A CORPORATION OF MASSACHUSETTS

BRAKE

Application filed July 26, 1930. Serial No. 470,929.

The invention relates to vehicle brakes of the internal expanding type and more particularly to mechanism for applying the brake.

My co-pending application Serial No. 415,902, filed December 23, 1929, describes a self-centering brake applying mechanism embodied in a vehicle brake comprising a pair of substantially semi-circular brake shoes connected at adjacent ends to a common pivotal mounting. The shoes are moved into engagement with the brake drum by separating the free ends by a mechanism comprising a shaft rotatably mounted in the free end of one shoe and carrying a one-lobed cam adapted to engage the free end of the other shoe. The cam shaft is arranged to move laterally relative to the backing plate and is rotated by suitable means operated by the usual brake pedal. While this brake applying mechanism provides for a smooth, soft and powerful braking action, the construction of some standard vehicles is such that some of the parts interfere with this brake applying mechanism.

It is an object of the present invention to provide a brake applying mechanism embodying similar principles which is adapted for general application.

A further object of the invention is the provision of an improved self-centering brake applying mechanism.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawings, in which:

Fig. 2 is a top plan view, partly in section;

Fig. 3 is a detail perspective view of some of the parts of the brake operating mechanism;

Fig. 4 is a perspective view of one of the members forming part of the brake operating mechanism;

Fig. 5 is a top plan view, partly in section, of a brake embodying a modified form of the invention;

Fig. 6 is a side elevation of a portion of the modified brake operating mechanism; and Fig. 7 is a perspective view of some of the members forming part of the modified brake operating mechanism.

Figure 1:
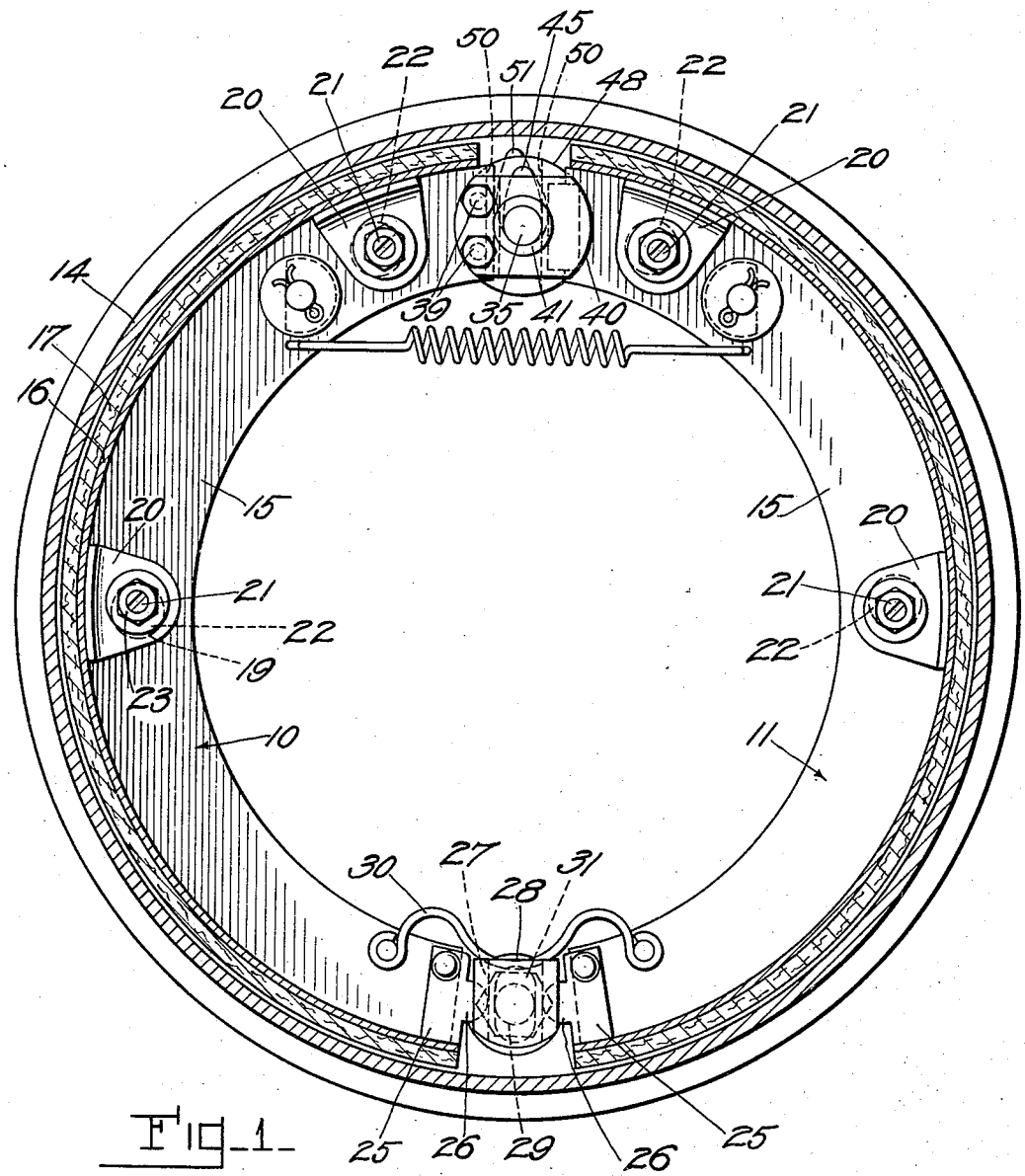
Fig. 1 is a side elevation, partly in section, of the vehicle brake embodying the invention, the parts being shown in the relative positions they assume before the brake is expanded.

One embodiment of the invention is illustrated in Figs. 1 to 4 of the accompanying drawings which shows a brake comprising a brake shoe composed of sections 10 and 11 suitably mounted upon a fixed backing plate 12 so as to be moved into and out of engagement with a brake drum 14 rotatable with the vehicle wheel. The brake shoes 10 and 11 may be of any usual construction, but as illustrated each may comprise a substantial non-deformable member 15 and a deformable contact member 16 carrying a suitable friction material, such as a brake lining 17. The members 15 and 16 are joined together by suitable spaced connections each comprising a pair of spaced brackets 20 fixed to the member 16 and enclosing the member 15. Each of the brackets 20 is provided with an opening 18 serving as a bearing for an eccentric shaft 21 carrying an eccentric 22 engaging a circular opening 19 in the member 15. Each shaft 21 is provided with a head 24 adapted to engage one of the brackets 20 and is locked against rotation by a suitable clamp, such as a nut 23 engaging the opposite bracket 20. The members 15 and 16 of each brake shoe are secured together at one end by a suitable bracket 25 having a projection 26 provided with a curved end adapted to be received in a groove 27 in the edge of a block 28 mounted upon an anchor pin 29, which is adjustably mounted upon the backing plate 12, as by a nut 31 on the pin 29 engaging the plate 12. A spring 30 is secured at its end to each of the members 15 with its intermediate portion in engagement with the block 28 so as to tend to move each of the shoes 10 and 11 inward with respect to the block.

One mechanism embodying the invention for separating the free ends of the shoes 10 and 11 to bring them in engagement with the drum may comprise a cam shaft 35 supported solely by one of the brake shoes. For this purpose, the free end of one of the members 15 is positioned in a groove 38 in a block 37 having a bearing 34 for rotatably supporting the shaft 35. The block 37 is secured to the member 15 by bolts 39 which also serve to secure a cap 40 to the block 37. The cap 40 also embraces the free end of the other member 15 and holds it in sliding engagement with the block 37. The outer end of the shaft 35 is rotatably supported in a bearing 41 in the cap 40. A cam 45 is carried by the shaft 35 and is positioned thereon between the block 37 and the cap 40 so as to engage the free end of the member 15 which is slidable between the cap and block. The inner end of the shaft 35 is provided with a square end 46 (see particularly Fig. 3) adapted to be received in a similarly shaped hole 47 in a disk 48. The disk 48 is provided with a slot 49 offset from the center thereof, and providing bearing faces 50 for a cam 51 carried by a shaft 52 mounted for rotation in a bracket 53 secured to the backing plate, as by bolts 54. The shaft 52 is connected to the brake pedal of the vehicle (not shown) by the usual mechanism including a lever 55 clamped upon the shaft 52.

In operation the brake shoes 10 and 11 are expanded against the drum 14 by depressing the brake pedal (not shown) to cause rotation of the shaft 52 to bring the cam 51 into engagement with one of the bearing faces 50 on the rotatable member or disk 48 and turn the same. Rotation of member 48 causes rotation of the shaft 35 to move the cam 45 into engagement with the free end of the member 15 which is slidably mounted between the cap 40 and the block 37 and thus separate the members 15 to bring them in engagement with the drum 14.

In the brake embodying the modified form of brake operating mechanism illustrated in Figs. 5 to 7 inclusive, the shaft 52' carrying the cam 51' is rotatably mounted in a bracket 53' secured to the backing plate 12', as by bolts 54'. A rotatable member or disk 48' is rotatably positioned against the backing plate 12' and its inner face is provided with a slot 49' offset from the center thereof and providing bearing surfaces 50' to receive the cam 51'. The outer face of the member 48' is provided with a projection 60 of cylindrical shape having a peripheral slot 61 adapted to receive the free end of one of the members 15'. The projection 60 is surrounded by an annular ring 62 which serves as a bearing rotatably supporting the member 48'. The ring 62 is provided with a peripheral opening 63 of the same width as the slot 61 and which terminates in surfaces 64 normally positioned in alignment with the bottom of the slot 61. A slot 65 is formed in the periphery of the ring 62 diametrically opposite the opening 63 and is adapted to receive the free end of the other member 15' which is secured thereto, as by set screws 66. The bottom 56 of the slot 61 serves as a cam.

The cam shaft 52' is rotated by operation of the brake pedal causing the cam 51' to engage with one of the faces 50' to rotate the member 48' causing the bottom 56 of the slot 61 to act as a cam to separate the shoes 15' and bring them into engagement with the drum. It will be noted that the opening 63 in the ring 62 is, in effect, a continuation of the slot 61 in the projection 60 and that the member 15' inserted in the opening 63 and slot 61 effectively locks the member 48' to the ring 62.

I claim:

1. In an internal expanding brake, a brake drum, a pair of brake shoes, a disk carried by one of said shoes and having a peripheral slot to receive the other shoe, a member rotatably carried by said disk and having a slot in one face, means actuated by said member and operable in the slot in said disk to engage said other shoe, and means adapted to slidably engage the slot in said member to rotate said member.

2. In an internal expanding brake, a brake drum, a pair of brake shoes, a disk carried by one of said shoes and having a peripheral slot to receive the other shoe, a member rotatably carried by said disk and having a slot in one face, said member having a projection rotatably carried by said disk, said projection having a peripheral slot to receive said other shoe whereby said other shoe locks said member and disk together, the bottom of the last mentioned slot serving as a cam to separate said shoes.

In testimony whereof I affix my signature.

GEORGE H. STONER.